United States Patent [19]
Hatch

[11] 3,890,716

[45] June 24, 1975

[54] VERNIER INDICATOR

[76] Inventor: Donald Hatch, 10 Whaley Ln. Whaley Bridge, Stockport, England

[22] Filed: Oct. 9, 1973

[21] Appl. No.: 404,594

Related U.S. Application Data
[63] Continuation-in-part of Ser. No. 67,342, Aug. 27, 1970, abandoned, which is a continuation-in-part of Ser. No. 791,901, Jan. 17, 1969, abandoned.

[52] U.S. Cl. .................................. 33/1 D; 116/115
[51] Int. Cl. ............................................. G01d 3/10
[58] Field of Search .................. 33/111, 143 A, 1 D; 116/115

[56] References Cited
UNITED STATES PATENTS

| | | | |
|---|---|---|---|
| 2,876,543 | 3/1959 | Dzaack | 33/1 D |
| 3,060,584 | 10/1962 | Westfall | 33/143 R |
| 3,241,515 | 3/1966 | Franklin | 116/115 X |

Primary Examiner—Richard E. Aegerter
Assistant Examiner—Charles E. Phillips
Attorney, Agent, or Firm—Paul Gallagher

[57] ABSTRACT

A pair of circular dial members relatively movable angularly on a common axis, and having superimposed dial faces transverse to the axis, one of the dial members having a circular normal scale on its dial face, and the other having a pointer on its dial face cooperating with the normal scale; one of the members having a second scale of greater radius than the normal scale and constituting an expanded scale relative thereto, and the other member having a circular third scale of substantially the same radius as the expanded scale and the third scale having dissimilarly spaced indicating elements, forming a vernier indicating relationship therebetween.

24 Claims, 12 Drawing Figures

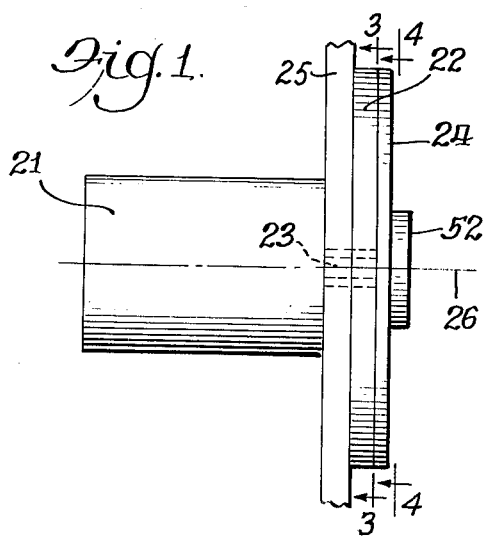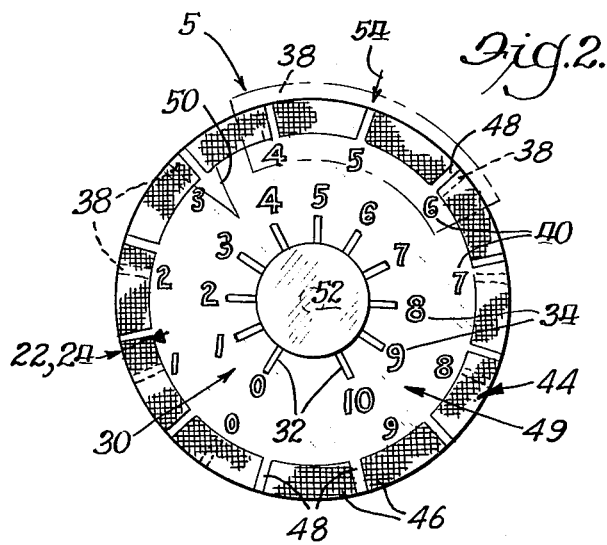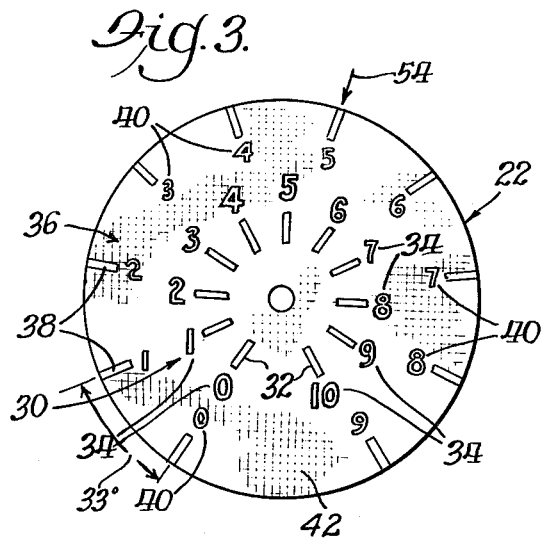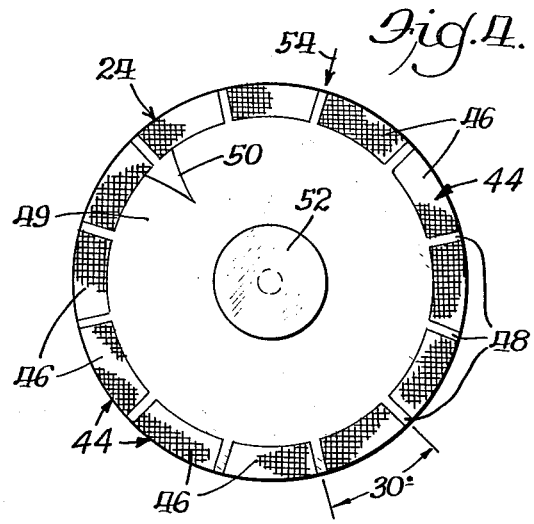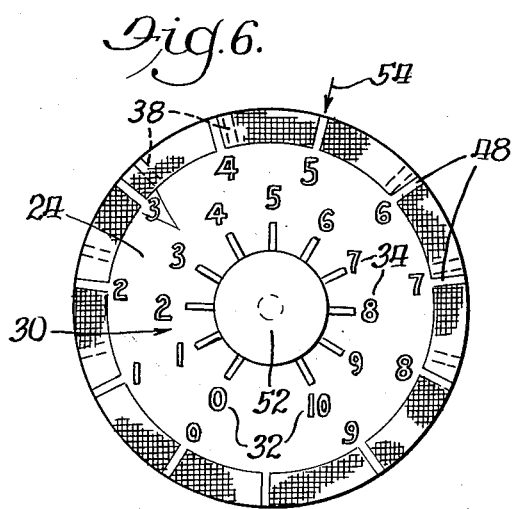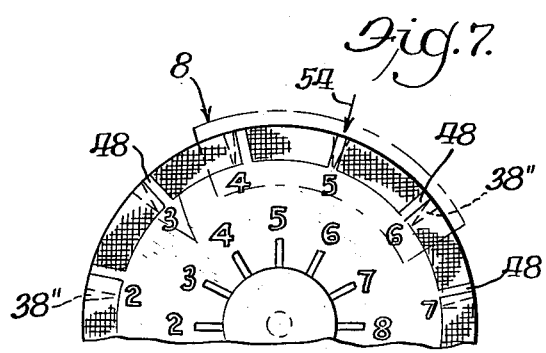
Inventor:
Donald Hatch
By Paul H. Gallagher
Atty.

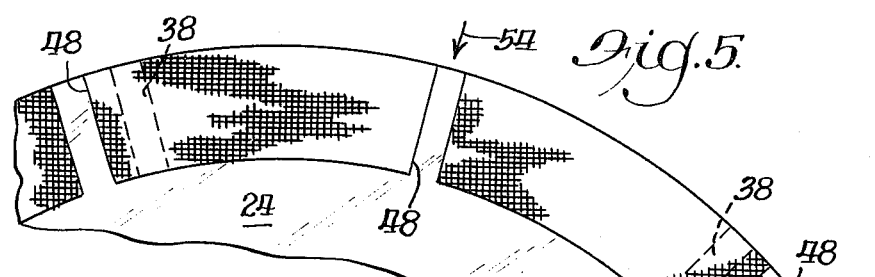
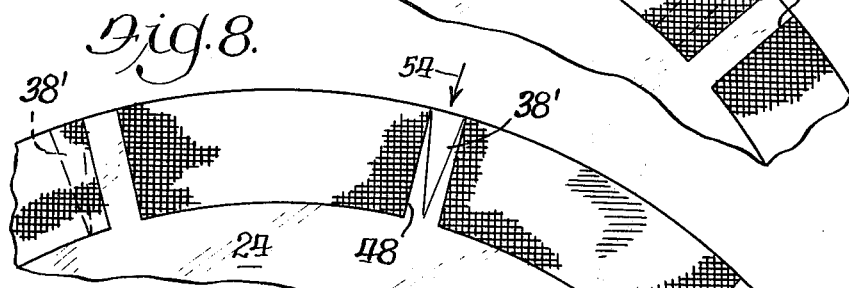
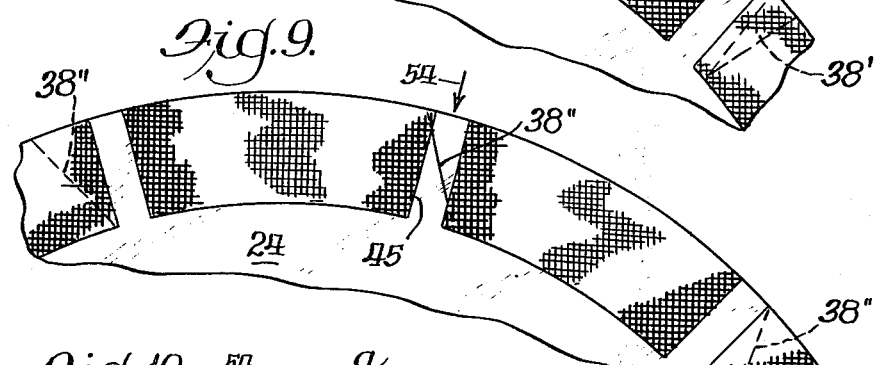
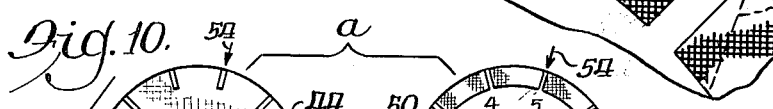
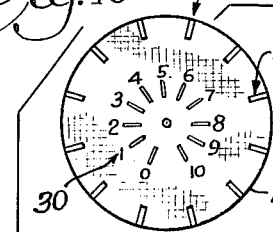
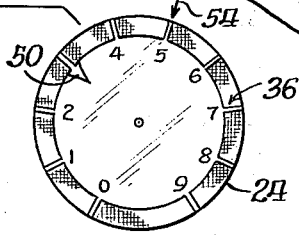
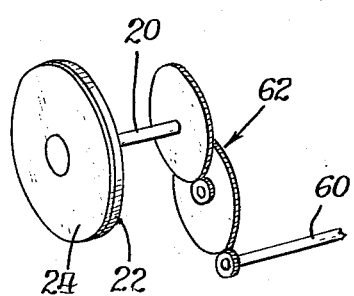
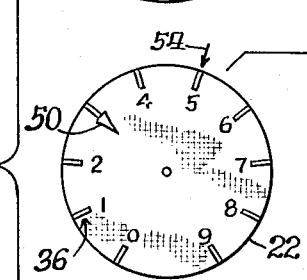
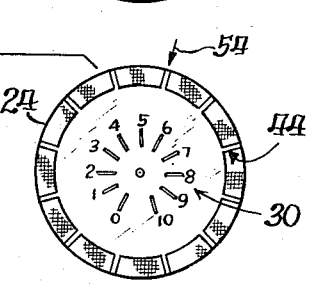
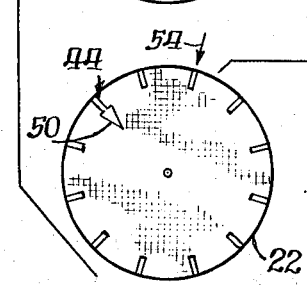
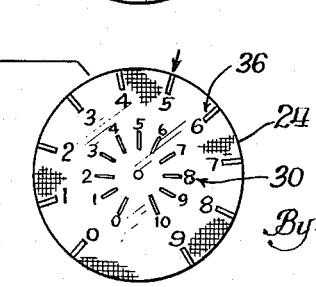

VERNIER INDICATOR

This application is a continuation-in-part of my prior application Ser. No. 67,342, filed Aug. 27, 1970, which itself is a continuation-in-part of my prior application Ser. No. 791,901, filed Jan. 17, 1969, both of those prior applications being now abandoned.

OBJECTS OF THE INVENTION

A broad object of the invention is to provide a novel vernier indicator which can be made of relatively small size providing a relatively high degree of accuracy.

Another and broad object is to provide a vernier indicator which can be of very small size and is of extremely great accuracy, this relationship being possible by a circular shape of the device and more particularly by a unique arrangement of circular indicator scales including a first scale indicating divisions positioned adjacent a central axis, and scales indicating subdivisions positioned radially outwardly of the first scale.

Another object is to provide a vernier indicator having scales indicating divisions and subdivisions, including a novel arrangement whereby only a single subdivision is indicated at a time, thereby enabling the user to read the device faster and more accurately than could be done heretofore.

A further object is to provide a vernier indicator of the character just immediately referred to, in which the indicated subdivision is the only one exposed, whereby to enable more effective illumination, or contrast, or both, and thereby to render it more easily read.

A still further object is to provide a vernier indicator of the foregoing character, in which the division is individually, and visually, identified, as by number, and also the subdivision is individually, and visually, identified, as by number.

Still another object is to provide a vernier indicator of the foregoing general character which includes superimposed dial members including lower and upper members, bearing indicator scales, at least certain ones of the indicator scales being in register axially and wherein the scale on the upper dial member includes transparent elements, or voids, whereby to enable the user to observe the indicator elements of the scale on the lower member through the transparencies or voids on the upper member and thereby enable visual observation of relatively great accuracy.

An additional object is to provide a vernier indicator and control device having a pair of relatively rotatable dial members having cooperating indicator scales, and wherein the dial members include cooperating control elements and are relatively pre-settable for indicating amounts or increments of progression or advancement to be accomplished, and the dial members are adapted to cooperation with control elements put in a predetermined control position by the pre-setting arrangement of the dial members, a specific example being predetermining electrical resistance for initiating or terminating an electrical operation.

Another object is to provide a vernier indicator of the foregoing general character which includes a pair of superimposed dial members including a lower member and an upper member, presenting circular scales and relatively movable on a common axis, wherein one of the dial members includes a relatively small circular normal scale with circumferentially distributed main division indicating elements, one of the dial members includes a second scale of greater radius than the normal scale and having division indicating elements distributed circumferentially in the same angular spacing as the elements of the normal scale and thereby constituting an expanded scale relative to the normal scale, and further wherein the dial member other than the one bearing the expanded scale, includes a vernier third scale in register axially with and directly cooperable with the expanded scale and having subdivision indicating elements, whereby vernier measurements can be made in utilizing the expanded scale providing greater accuracy relative to making vernier measurements in utilizing the smaller normal scale, and wherein the upper dial member has transparent portions or apertures in the scale thereon whereby the user can more easily observe the indicator markings on the scale on the lower member.

An additional object is to provide a vernier indicator of the character referred to immediately above, wherein the indicator markings on the second scale, or the third scale, or both, are positioned or shaped out of straight radial lines, whereby to provide additional accuracy in reading the scales in any given relative angular position of the dial members because the displacement out of the straight radial lines provides greater radial positional indications for a given increment of rotational movement.

Still an additional object is to provide a vernier indicator having a pair of relatively rotatable dial members, and interacting scales thereon, and including a novel arrangement whereby at least certain of the scales in the manufacture of the device, can be selectively pre-positioned on either of the dial members.

DESCRIPTION OF A PREFERRED EMBODIMENT OF THE INVENTION

In the drawings:

FIG. 1 is a side view of a vernier indicating device embodying the features of the present invention in conjunction with a cooperative instrumentality;

FIG. 2 is an end view taken from the right of FIG. 1;

FIG. 3 is a face view of the lower dial member of the device, taken at line 3—3 of FIG. 1;

FIG. 4 is a face view of the upper dial member, taken at line 4—4 of FIG. 1;

FIG. 5 is a large scale view of the portion of FIG. 2 enclosed in dot-dash lines and indicated at 5 in that figure;

FIG. 6 is a view similar to FIG. 2 but showing an alternative arrangement of indicating elements;

FIG. 7 is a view similar to FIGS. 2 and 6 and showing another alternative arrangement of the indicating elements;

FIG. 8 is an enlarged view of the portion of FIG. 7 enclosed in dot-dash lines and indicated at 8 therein;

FIG. 9 is a view similar to FIGS. 5 and 8 showing an additional alternative arrangement of indicating elements;

FIG. 10 is a semi-diagrammatic view of the dial members bearing the scale indicia or indicator elements, and the different arrangement and positioning of the indicator elements relative to the two dial members in each of various combinations;

FIG. 11 is a view similar to FIG. 1 but showing the two dial members in an opposite arrangement with respect to relative rotation of the dial members; and FIG. 12 is a semi-diagrammatic view of an alternative arrangement for utilizing the invention.

Referring in detail to the accompanying drawings, attention is directed first to FIGS. 1–4. The vernier indicator includes two main constructional components, namely a first or lower or under dial member 22 and a second or upper or over dial member 24. FIG. 1 is a side view of the vernier indicator as utilized with, or incorporated in, an instrumentality characteristics of which are to be controlled or measured. In this instance a potentiometer 21, for example, having a rotatable shaft 23 is mounted on a support 25 with the shaft extending freely therethrough. The dial member 22 is fixedly mounted on the support with the shaft 23 also extending freely therethrough, and the dial member 24 is secured to the shaft. In a case where the instrumentality is to be controlled, as in this instance, the dial member 24 would be manually rotated, thereby presetting the instrumentality, but where it is to be measured (see below), the instrumentality would rotate the dial member. In either case upon rotation of the dial member 24, the scale components which are on the dial members, as described below, interact to indicate the amount of relative rotation between the dial members and consequent extent of rotation of the shaft 23. The dial members are concentric with the central axis 26 of the shaft.

The scale components are produced on faces of the dial members disposed transversely to the axis 26, and the dial members are fitted together with the dial faces thus closely proximate.

Reference is next made to FIGS. 2–4, wherein FIG. 2 shows the dial members superimposed while FIG. 3 shows the first or lower dial member 22, and FIG. 4 shows the second or upper dial member 24. The lower dial member 22 as shown includes a first indicator scale 30 which will also be referred to as a normal scale, consisting of indicia including a circular series of radial lines or marks 32, and associated therewith at the outer ends thereof, a series of numerals 34 from 0 to 10 inclusive. The spacing between the lines 32 may be as desired, in the present instance 30°, except that there is a greater spacing from the final 10 line continuing to the initial 0 line.

The lower dial 22 also bears another scale 36 which will also be referred to as a vernier scale or third scale, and which consists of indicia including a plurality of radial lines or marks 38 positioned at the periphery, and a series of numerals 40 associated therewith adjacent the inner ends thereof. Preferably the numerals 34 and the numerals 40 are of different sizes, so that those in the respective series are readily distinguishable from each other, for example, the numerals 34 are larger than the numerals 40 as shown in FIG. 3. The lines 38 in the vernier scale are ten in number, being numbered from 0 to 9 inclusive and spaced apart, in the present instance, an angular distance greater than that of the spacing in the normal scale 30, or 33°. The 0's in the scales 30 and 36 are in radial alignment, a matter to be referred to again hereinbelow. The vernier scale 36 has vernier association directly with an expanded scale 44 on the upper dial member 24 as described below, and indirectly therethrough with the normal scale 30. The normal scale 30 includes ten spaces between the lines 32 while the vernier scale 36 includes ten lines 38 in accordance with the usual and desired decimal division in vernier indicators.

The lower dial member 22 may be of any suitable material and is preferably provided with a dark, e.g., black, background 42 and preferably the lines 32, 38 are white or highly reflective for high contrast therewith.

The upper dial member 24 is preferably of colorless transparent material, provided with a second scale 44 consisting of indicia including a circular series of black or other high contrast color, opaque, segments 46 spaced apart to define apertures or spaces 48 which are in the shape of lines, and which are of course transparent. If desired, the apertures 48 may be formed by cutout portions. This scale 44 is of the same angular arrangement as the normal scale 30, i.e., the apertures 48 are spaced apart 30° and positionable in radial alignment respectively with the lines 32 of the scale 30. The scale 44 is of greater radius than the normal scale 30 and constitutes an expanded scale relative thereto.

The dial member 24 is provided with a central or annular transparent space 49 which exposes at least the greater part of the lines 32 of the normal scale, and the numerals 34 associated therewith, as well as the numerals 40 of the vernier scale, while the apertures 48 individually expose the lines 38 of the vernier scale. Preferably the dial member 24 is very thin, to eliminate or minimize oblique reading problems. The upper dial member 24 is provided with an index pointer 50 cooperating with the normal scale 30.

If desired the upper dial member 24 may be provided with a knob 52 for manually rotating that member, or if desired, that knob may be omimtted and the dial member 24 rotated by gripping its periphery.

FIG. 2 represents the relationship between the scales on the dial members 22, 24. Assuming an arbitrary measuring position in which the index pointer 50 is between the numerals 3 and 4 of the normal scale, and respective ones of the indicia 48, 38 are in register at position 5 of the vernier scale as indicated by the arrow 54, the measurement indicated would be three angular spaces of 30° each and five angular spaces of 3° each, totalling 105° from the starting position. In this position, the line 38 of the vernier scale at position 4 would be in front of the corresponding aperture 48, while the line 38 of the vernier scale at position 6 would be beyond the corresponding aperture 48.

The device presents an extremely convenient and easy readout, the dial faces and the indicia thereon being within a predetermined circular area, transverse to the central axis (26) and presenting an orthographic projection along that axis. The user can at a glance observe the position of the index pointer 50 relative to the numerals 34 in the normal scale, and he can as readily observe the indicated vernier measurement by relating to that numeral 40 in the vernier scale at which the indicia 48, 38 are in register, eliminating the necessity for counting increments in the vernier scale. Because of the exposure of the numerals 34 and 40 through the central transparent space 49, the user can easily and quickly read the measurement or setting. Only one vernier line 38 is indicated, and even exposed, at a time, rendering the device extremely easy to read.

The lines 38 should be no greater in width than the apertures 48 and preferably they are thinner, to facilitate visual observation in centering the lines 38 in the apertures, and so long as the lines 38 are thus thinner than the apertures, the exact dimension thereof is not critical.

In the rotation of the upper dial member 24 in forward direction, i.e., clockwise in FIGS. 2-4, the apparent movement of the vernier indication is in the same direction, e.g., registration would be first at, e.g., numeral 4 of the vernier scale 36, then at numeral 5, and then at numeral 6, etc. This apparent rotation is referred to herein as "like rotation" and occurs when the angular spacing of the lines 38 in the vernier scale is greater than that of the apertures 48 in the expanded scale. However, this relative spacing is not essential to the invention, and may assume the opposite condition as represented in FIG. 6 where the angular spacing of the lines 38 in the vernier scale is less than that in the expanded scale, and it will be observed that the apparent movement in the vernier indication is opposite the direction of rotation of the dial members 24, and will be referred to herein as "contra rotation," i.e., upon rotation of the dial member to the right, registration would first be at, e.g., numeral 6, then at numeral 5, then at numeral 4, etc.

The apparent movement of the vernier indication in fixedly mounted and the dial member 22 rotatably mounted, and for such a construction, attention is directed to FIG. 11 which includes an instrumentality 56 having a shaft 57 driven thereby. The dial member 22 is fixed on that shaft and rotated therewith, but the dial member 24 is fixedly mounted in a suitable support 58 having an aperture or window 59 exposing the face of the dial 24.

Referring again to the apparent movement of the vernier indication, in any given relative spacing of the indicia in the vernier scale and the indicia in the expanded scale, opposite relative rotation between the dial members produces respectively opposite apparent movement of the vernier indication. The following table or chart sets out the possible combination involving the different vernier spacings and directions of rotations of the dial members, and resulting apparent movement of vernier indicators (in the table Vd is --Vernier scale, and $Ens_d$ is Expanded normal scale --).

| I Lower Member Fixed | | |
|---|---|---|
| | Upper Member Movable: | Lower Member Fixed: |
| | a) bears expanded normal scale indicia and pointer | a) bears normal scale indicia and vernier indicia |
| Rotation $Vd>Ens_d \approx$ like rotation $Vd<Ens_d \approx$ contra rotation | | |
| | b) bears vernier indicia and pointer | b) bears normal scale indicia and expanded normal scale indicia |
| Rotation $Vd<Ens_d \approx$ like rotation $Vd>Ens_d \approx$ contra rotation | | |
| II Upper Member Fixed | | |
| | Upper Member Fixed: | Lower Member Movable: |
| | a) bears normal scale indicia and vernier indicia | a) bears expanded normal scale and pointer |
| Rotation $Vd>Ens_d \approx$ like rotation: $Vd<Ens_d \approx$ contra rotation: | | |
| | b) bears normal scale indicia and expanded normal scale indicia | b) bears vernier indicia and pointer |
| Rotation $Vd<Ens_d \approx$ like rotation $Vd>Ens_d \approx$ contra rotation | | |

"like" or in "contra" rotation, is related not only to the difference in spacing between the indicia of the vernier scale and the indicia of the expanded scale, but also in relation to the relative rotation between the dial members. As noted above, in one form of construction (FIG. 1), the preferred form, the dial member 22 is fixedly mounted and the dial member 24 is rotatably mounted but the construction is also adapted for the opposite relative rotation, i.e., the dial member 24

The scales may be positioned on different ones of the respective dial members 22, 24, except that the normal scale 30 and the index pointer 50 must be on different dial members, and the expanded scale 44 and the vernier scale 36 must be on different dial members. FIG. 10 shows the different arrangements of the scales as they may be provided on the different dial members. The arrangement of FIGS. 2-4 may be considered a first, and preferred, arrangement and those of FIG. 10 alternative arrangements. In FIG. 10a the normal scale 30 and pointer 50 are as in the first arrangement but the scales 36, 44 are reversed. In FIG. 10b the normal scale 30 and the pointer 50 are respectively on opposite members relative to FIGS. 2-4, while the vernier scale 36 and expanded scale 44 are in the same positions as in FIGS. 2-4. FIG. 10c shows all of the scales reversed relative to FIGS. 2-4, i.e., the normal scale 30 is disposed on the upper dial member 24 and the pointer 50 on the lower dial member 22, and the vernier scale 36 is on the upper dial member while the expanded scale 44 is on the lower dial member. It will of course be understood that when the scales 36, 44 are reversed, the indicia 36 of the vernier scale will be in the form of transparent elements or apertures.

FIG. 8 shows a different shape of scale indicia. In this instance the apertures 48 may be of the same shape as before, while the lines 38' of the vernier scale are wedge-shaped, with their widest portion, for example, substantially the width of the apertures 48. This arrangement provides an advantage in that the observer can easily and accurately read out the indication, since if the widest part of the line 38' is fully exposed through the aperture 48, it is centered relative thereto. Additionally, the arrangement is such that if one line 38' is fully exposed, neither of those adjacent thereto will be exposed, but if either of the latter is partially exposed, the first will not be centered.

FIG. 9 shows another alternative shape of scale lines. In this instance the lines 38" of the vernier scale are straight but disposed at an angle to the radial, and each line is exposed through the aperture 48 at a position radially of the latter according to the degree of registration therewith, i.e., when exact registration is achieved, the line 38 will be exposed midway radially of the aperture, while if it is not exactly registered it will be exposed at an outer or inner position radially of the aperture. In this case, as in the case of FIG. 8, the lines 38" in front of and beyond the subject line preferably are not exposed when the subject line is in full register, aiding in the observation of the subject line. If desired, the lines 38" may be of minimum width, as indicated.

FIG. 12 represents diagrammatically the use of the device for measuring. An input element 60 such as a shaft connnects with a motion transmitting means 62 and rotates the shaft 20 which is connected with the movable one of the dial members 22, 24, the other being fixed to some support member (not shown). Thus the extent of rotation of the input member 60 is measured according to the vernier relationship.

The central transparent portion 49 of the upper dial member is circumferentially continuous and exposes all of the normal scale and the numerals of the vernier scale and the user can quickly and easily observe all indications, both the normal measurements (divisions) and the vernier measurements (subdivisions). The position of the index pointer 50 is quickly observable as is, of course, the pertinent vernier indication, this latter being the only one exposed and observable, as noted above. The O' in these two scales, normal and vernier being in alignment, as they are, the scales accurately indicate the starting position and since the normal scale and the numerals of the vernier scale are exposed completely circumferentially around the dial the arrangement enables full utilization of the device throughout 360°.

Another advantage of the device is that since the vernier relation between the vernier scale and the expanded scale is shown at the periphery of the dial members, the subdivisions can be expanded indefinitely in spacing, limited only by the size of the diameter of the dial members.

Another advantage is that the dark segments 46 and the light color or reflective character of the indicia 38 provide high contrast and render the device more quickly readable.

Additionally, because of the high contrast between the black or dark, and the white or reflective, visual observation is rendered easy by direct or reflected light, eliminating the necessity of back lighting or illuminating. However, if it should be desired to utilize back lighting or illuminating, the device is readily adaptable to that form. It is possible to reverse the colors or contrast, i.e., to utilize black where white or reflective is now used, and vice versa.

Although the spacing of the indicia in the different scales is based on the decimal system, it will be understood that other spacing may be utilized instead.

I claim:

1. A circular vernier indicator of hand manipulatable dimensions and of an outer diameter of within the range of hand gripping, comprising
   a lower dial member and an upper dial member rotatable relative to one another about a common axis and having upwardly directed dial faces transverse to the axis and positioned in operable relative axial proximity, and having physical characteristics such as to enable visual observation of the scales, referred to below, on both dial faces in direction from upwardly of the dial members,
   a. one of the dial members having a circular normal scale on its dial face adjacent the axis with radial indicating elements angularly spaced and distributed circumferentially,
   b. the dial member other than in (a) having an indexing element positioned generally radially outwardly of the normal scale and having a radially inwardly directed point adjacent the normal scale and cooperable with that scale,
   c. one of the dial members having a circular second scale on its dial face adjacent its periphery and spaced radially further from the axis than the normal scale and having indicating elements distributed circumferentially at the same angular spacing of the normal scale and thereby constituting an expanded scale relative thereto, the second scale being made up of elements so dimensioned and proportioned that the indicating elements therein are of circumferential dimension similar to that of the indicating elements of the normal scale, and portions between the indicating elements of much greater circumferential dimension than the indicating elements and effectively obstructing visual comparison between the second scale and the vernier scale referred to below, and
   d. the dial member other than in (c) having a circular third scale on its dial face with indicating elements distributed circumferentially and angularly spaced dissimilarly to those of the second scale and thus constituting a vernier scale, but also having portions between the indicating elements of much greater circumferential extent than the indicating elements and of nonindicating character.

2. A vernier indicator according to claim 1 and including a mounting member, and wherein the lower dial member is fixedly mounted thereon and the upper dial member is rotatably mounted thereon.

3. A vernier indicator according to claim 1 and including a mounting member, and wherein the upper dial member is fixedly mounted thereon and the lower dial member is rotatably mounted thereon.

4. A vernier indicator according to claim 1 wherein both dial members are of the same size, and the expanded and vernier scales are of substantially the same radius registered in axial direction, and the registered scale on the upper dial member includes voids constituting the indicating elements and through which the indicating elements of the registered scale on the lower dial member are exposed.

5. A vernier indicator according to claim 4 wherein the registered scale on the upper dial member includes a series of dark segments circumferentially spaced apart to form said voids therebetween, and the indicating elements in the registered scale on the lower dial member are light in color and in high contrast to said dark segments.

6. A vernier indicator according to claim 4 wherein the registered scale on the upper dial member includes a series of dark segments circumferentially spaced apart to form said voids therebetween, and the indicating elements in the registered scale on the lower dial member are of reflective character and in high contrast to said dark segments.

7. A vernier indicator according to claim 4 wherein the voids are apertures formed by cut-out portions in the upper dial members.

8. A vernier indicator according to claim 4 wherein the upper dial member is of transparent material, the registered scale on the upper dial member includes a series of circumferentially spaced segments of opaque material applied to the transparent material, and the voids are formed by uncovered portions of the transparent material between said segments.

9. A vernier indicator according to claim 4 wherein the indicating elements in both the registered scales are in the form of straight radial lines.

10. A vernier indicator according to claim 4 wherein the indicating elements in the registered scale on the upper dial member are in the form of straight radial lines, and the indicating elements in the registered scale on the lower dial member are of wedge shape with their wide portions of substantially the same width as the indicating elements in the registered scale on the upper dial member.

11. A vernier indicator according to claim 4 wherein the indicating elements in the registered scale on the upper dial member are in the form of straight radial lines, and the indicating elements in the registered scale on the lower dial member are also in the form of straight lines but inclined to the radial and thereby inclined to the indicating elements in the registered scale on the upper dial member.

12. A vernier indicator according to claim 1 in which the indicating elements in the vernier scale are more widely spaced than those in the expanded scale, and the dial members are relatively rotatable in opposite directions.

13. A vernier indicator according to claim 1 in which the indicating elements in the vernier scale are more closely spaced than in the expanded scale, and the dial members are relatively rotatable in opposite directions.

14. A vernier indicator comprising:
a. a lower dial member and an upper dial member superimposed one upon the other and rotatable relative to one another about a central axis, the upper surface of the lower dial member and the lower surface of the upper dial member respectively having flat planar portions which are in close juxtaposition with one another within a specified circular area including the upper surface of the lower dial member, said specified circular area corresponding to an orthographic projection, along said axis, of portions of the upper dial member upon the upper surface of the lower dial member;
b. a plurality of spaced apart indicia arranged on one dial member around a first circular path about said central axis and within said specified circular area, with said path being radially close to said central axis, said indicia forming a circular scale;
c. an indexing element carried by a dial member other than in (b) and positioned in a cooperating indicating relationship to the indicia forming said normal scale;
d. a plurality of spaced apart indicia arranged on one dial member around a second circular path about said central axis in close juxtaposition to the perimeter of said specified circular area, with said second path being radially further away from said central axis than is said first path, the indicia of said second path bearing the same angular spacing about said central axis as the indicia of said first path, to form an expanded scale;
e. a plurality of spaced apart indicia arranged on a dial member other than in (d) around a third circular path about said central axis, said third circular path being radially disposed closer to said second path than it is said first path, with the angular spacing between the indicia thereon about said central axis being different from said angular spacing of the indicia forming said expanded scale, to permit the indicia of said third path to cooperate with and act as a vernier scale relative to the indicia forming said expanded scale;
f. the indicia of (d) and (e) is superimposed with at least one of the bottom indicia being viewable through one of the top indicia, the indicia of (b) and the indexing element (c) all being constantly viewable.

15. A vernier indicator according to claim 14 wherein;
the indicia of the normal scale are angularly spaced apart uniformly in a direction from a first to a last in a circle, and the angular spacing between the last and the first in said circle in the same direction being greater than the spacing between the remaining indicia; and wherein
the indicia in the vernier scale are angularly spaced apart a distance different from the angular spacing between the indicia of the normal scale progressing from the first to the last of the latter.

16. A vernier indicator according to claim 15 wherein;
the uniform angular spacing between the indicia of the normal scale from the first to the last, is substantially 30°, and the angular spacing from the last to the first, continuing in the same circular direction, is substantially 60°.

17. A vernier indicator according to claim 16 wherein;
the normal scale and the vernier scale are arranged on the same dial member, and
the indicia on the vernier scale also includes indicia from a first to a last, and wherein
the first of the indicia of the vernier scale is radially aligned with the first of the indicia of the normal scale, and further wherein,
the angular spacing between the last and the first of the indicia of the vernier scale is greater than the uniform spacing of the indicia of the normal scale proceeding from the first to the last.

18. A vernier indicator according to claim 14 wherein;
the angular spacing of the indicia in the vernier scale is greater than the angular spacing of the indicia in the expanded scale, whereby upon relative rotation of the dial members, the apparent movement of the vernier indication is in the same direction as the relative rotation of the dial member bearing the vernier scale.

19. A vernier indicator according to claim 14 wherein;
the angular spacing of the indicia of the vernier scale is less than the angular spacing of the indicia in the expanded scale, whereby upon relative rotation of the dial members, the apparent rotation of the vernier indication is in direction opposite the relative rotation of the dial member bearing the vernier scale.

20. A vernier indicator according to claim 14 wherein;
the indicia on both of the dial members extend substantially to the radial outer limits of said specified circular area.

21. A vernier indicator according to claim 20 wherein;
the surfaces of both of the dial members on which the indicia are arranged are closely adjacent planar form in shape throughout the extent of said specified circular area.

22. A vernier indicator according to claim 14 wherein;
the upper dial member covers at least certain of the indicia on the lower dial member, and
the upper dial member is of light transmitting charactersitics, in at least portions thereof, for exposing indicia on the lower dial member.

23. A vernier indicator according to claim 22 wherein;
the upper dial member is relatively thin whereby to minimize any inaccurate indication due to oblique viewing.

24. A vernier indicator according to claim 14 wherein;
the dial members are provided with numerals indicating respective ones of the indicia of the normal scale and the vernier scale, and wherein,
the numerals related to the indicia of the normal scale are larger than, and readily distinguishable from, the numerals related to the vernier scale.

* * * * *